United States Patent [19]

Mergenthaler et al.

[11] Patent Number: 4,656,344
[45] Date of Patent: Apr. 7, 1987

[54] INTEGRATED SCALE AND OPTICAL SCANNER

[75] Inventors: Barry M. Mergenthaler, Cambridge; Ronald J. King, New Concord; Laszlo I. Kovats, deceased, late of Byesville; James H. Taylor, administrator, Dayton; Richard E. Cone, Cambridge, all of Ohio

[73] Assignee: NCR Corporation, Dayton, Ohio

[21] Appl. No.: 707,916

[22] Filed: Mar. 4, 1985

[51] Int. Cl.⁴ .............................................. G06K 7/10
[52] U.S. Cl. .................................. 235/462; 235/378; 235/383; 235/385
[58] Field of Search ................ 235/462, 378, 383, 385

[56] References Cited
FOREIGN PATENT DOCUMENTS
51-061856 5/1976 Japan .
58-165017 9/1983 Japan .

Primary Examiner—Harold I. Pitts
Attorney, Agent, or Firm—Wilbert Hawk, Jr.; Albert L. Sessler, Jr.; Richard W. Lavin

[57] ABSTRACT

A checkout counter having an optical scanning unit located therein and includes a surface portion comprising a scale apparatus which includes a transparent portion enabling scanning beams projected by the optical scanner unit to be transmitted through the scale apparatus for reading a coded label on a merchandise item positioned on the scale apparatus. The scale apparatus generates data signals representing the weight of the merchandise item which are then transmitted to a processor means which also receives data signals from the scanning unit identifying the merchandise item. The processor means will generate the price of the merchandise item using the data signals received. The price of the merchandise item is then displayed on a display unit and printed by a printing unit on a customer's receipt.

8 Claims, 6 Drawing Figures

INTEGRATED SCALE AND OPTICAL SCANNER

BACKGROUND OF THE INVENTION

The present invention is directed to a checkout system and more particularly to a system wherein an optical scanner and an electronic weighing scale are integrated into a unitary structure.

Present day checkout systems, found in supermarkets or the like, include an optical scanning unit located within the checkout counter housing for scanning bar code labels on merchandise items which are moved across a window area in the top surface of the counter. The optical scanning unit translates the bar code labels into electrical data signals which can be used to identify the merchandise item and its price. Further included in the system is a data terminal device and an electronic scale, positioned away from the optical scanning unit, for weighing produce and other types of merchandise which is sold by weight. In determining the price of such merchandise, the checkout operator removes the item to be weighed from the checkout counter and places it on the electronic scale for a weighing operation which results in the generation of data representing the weight. If a bar code label is not affixed to the merchandise, a keyboard entry into the data terminal is also required to identify the merchandise. The data so generated is then used by the data terminal device to calculate the purchase price of the merchandise, to display the price and to print the price on a customer's receipt.

Because the electronic scale is positioned away from the optical scanning unit there is an interruption in the flow path of the merchandise which causes a delay in the checkout operation.

It is therefore an object of this invention to provide a checkout system which will both scan bar code labels and weigh merchandise items in the shortest time possible.

It is another object of this invention to provide a unitary structure that will both weigh merchandise items and scan bar code labels.

SUMMARY OF THE INVENTION

In the preferred embodiment of the invention there is provided, a checkout counter having an end portion and a movable cover having an aperture therein supported on the end portion of the counter. An optical scanner is positioned in the end portion of the counter adjacent the cover for projecting scanning light beams through the aperture for scanning a coded label on any merchandise item positioned on the cover and for generating first data signals identifying the merchandise item. A support member is mounted in the end portion of the counter adjacent the cover and a signal generator is mounted on the support members, engaging the cover, for generating second data signals representing the weight of the merchandise item positioned on the cover. A processor is connected to the optical scanner and the signal generator for generating third data signals representing the price of the merchandise item in response to the first and second data signals. There is also provided a display, operated by the processor, for displaying the price of the merchandise item in response to the generation of the third data signals.

BRIEF DESCRIPTION OF THE DRAWING

Additional advantages and features of the present invention will become more apparent and fully understood from a reading of the following description, taken in conjunction with the annexed drawings, in which.

DESCRIPTION OF THE PREFERRED EMBODIMENT

Figure 1:
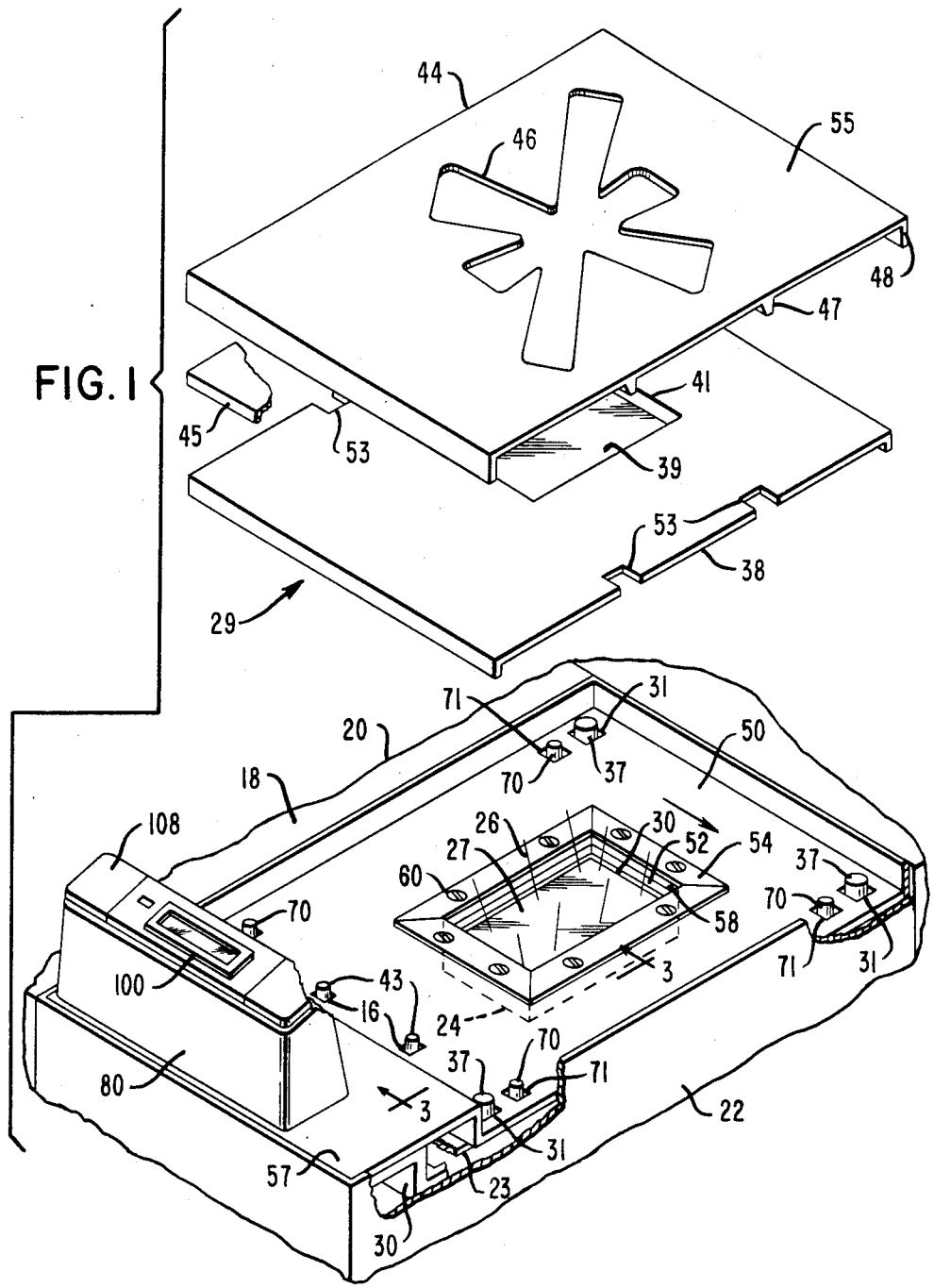
FIG. 1 is an exploded perspective view of the preferred embodiment of the invention.

Referring now to FIG. 1, there is shown an exploded view of the, checkout system of the present invention which includes a checkout counter 20 having a top supporting surface 18 for supporting merchandise items. The counter 20 further includes an end portion 22 in which is located an optical scanning unit 24 for projecting scanning beams 26 through a window segment 27. The end portion 22 of the counter 20 further includes a plastic support member 50 (FIGS. 1-3 inclusive) secured to the end portion 22 of the checkout counter in a manner to be described more fully hereinafter. The support member 50 further includes four cut-out portions 31 located at each of its corners in which are positioned four load beam cells 32 (See FIG. 3) and two cut-out portions 16 in which are positioned two guide pin members 43. Four rubber support members 37 are affixed, one each, to each load beam cell 32 (shown in FIG. 3), projecting upward through the cut-out portions 31. The four load beam cells 32 generate signals representing the weight of any item positioned on the rubber support members 37. A cover assembly 29 is mounted on the end of the four rubber support members 37. The cover assembly 29 is comprised of, a plastic cover member 44, a stainless steel support member 38, and a thin stainless steel support member 45. The plastic cover member 44 includes an aperture 46 through which the scanning light beams 26, from the scanning unit 24, are projected. The cover member 44 further includes turned down edge portions 48 and a plurality of depending feet portions 47. The feet portions 47 extend through openings in the support member 45 (not shown) and engage apertures 53, located in the support member 38, for positioning the cover member 44 on the support member 38. The support member 38 has a recessed portion 41 in which is mounted a window segment 39 sealed by a rubber seal 40 (See FIG. 3). The stainless steel support member 45 has an opening therethrough (not shown) corresponding to the window segment 39 in the support member 38. The window segment 39 is mounted in registry with a window segment 27. An aluminum support member 30, for supporting the load beam cells 32 and the window segment 27, located within a cut-out portion 52 in the support member 30, is affixed to the support member 50 in a manner to be described hereafter.

The support member 50 has mounted thereon a raised plastic clamp member 54, extending along the edge of the cut-out portion 52 and secured through a gasket member 58 to the support member 30 by eight screw members 60 for securing the support members 30 and 50 together. A plastic spacer member 62 (FIG. 3) is positioned between clamp member 54, the gasket member 58, and the support member 50 for preventing any liquids spilled on the cover member 44 from reaching the window segment 27. Further located on the support member 50 is a housing member 80 which includes a display member 100 for displaying the price of a merchandise item and an indicator member 108, used in the checkout operation, in a manner that will be described more fully hereafter.

Four safety stop pin members 70 are secured to the top surface of the support member 30 and extend through the cut-out portions 71 in the support member 50 for limiting the downward movement of the cover assembly 29.

Figure 2:
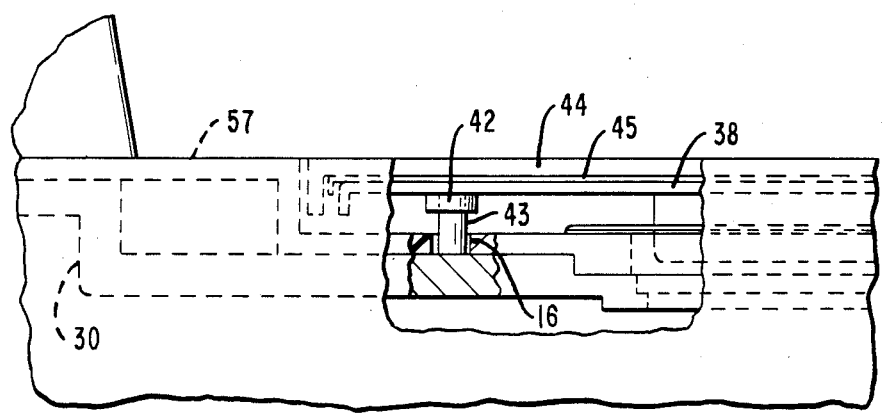
FIG. 2 is a cut-away partial side view of the preferred embodiment of the invention.

Further mounted on the under surface of the support member 38 are two recessed members 42 (FIG. 2). The recessed members 42 are in registry with the steel guide pin members 43, mounted to the support member 30. The recessed members 42 receive the pin members 43 for locating the cover assembly 29 on the support member 50 wherein the top surface 55 of the cover member 44 is coplanar with the top surface 18 of the checkout counter 20.

Figure 3:
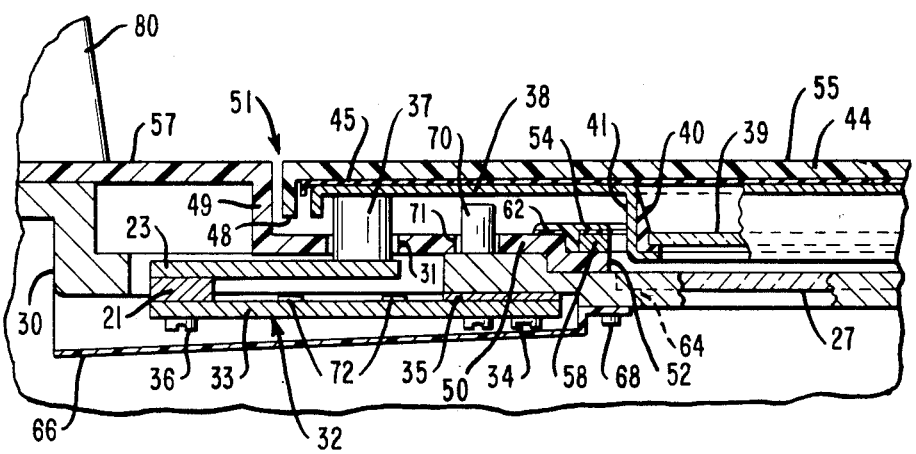
FIG. 3 is a partial sectional view taken on the section lines 3—3 of FIG. 1.

Referring to FIG. 3, each load beam cell 32 includes a first steel cantilever support member 33 secured by screw members 34 extending through an aluminum spacer 35 to the aluminum support member 30 which is coextensive with the support member 50 on the end portion 22 of the check-out counter 20. The first cantilever support member 33 is also secured through an aluminum spacer 21 to a second cantilever support member 23 by means of the screw member 36. The support member 23 has secured, at one of its ends, the rubber support member 37 which rubber support member extends through the cut-out portion 31, in the support member 50 to engage and support the stainless steel support member 38. Secured to the top surface of the cantilever support member 33, of each of the beam cells 32, are two strain gauge members 72 for producing electrical signals used in generating data signals representing the weight of the merchandise item positioned on the cover member 44 in a manner that is well known in the art.

The left edge portion 48 of the cover member 44, as viewed in FIG. 3 forms a channel 51 (FIG. 3) with an L-shaped edge portion 49 of the support member 50 which facilitates the removal of liquids spilled on a top surface portion 55 of the cover member 44 and a top surface portion 57 of the support member 50.

Secured to a bottom portion 64 of the support member 30 by the screw member 68 is a plastic chute member 66 which allows any liquids spilled on the cover member 44 that are diverted through the channel 51 and the cut-out portions 16, 31 and 71 to be removed to a collection area (not shown) located adjacent the end portion 22 of the checkout counter 20.

Figure 4:
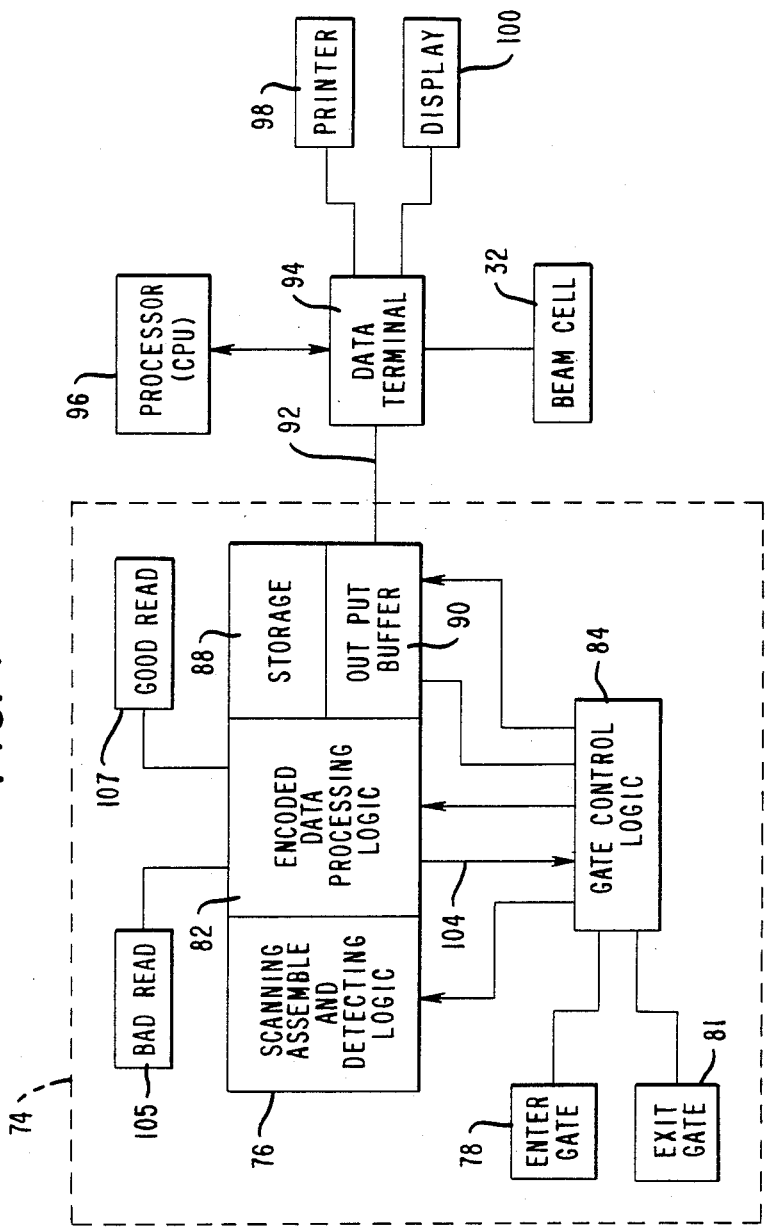
FIG. 4 is a block diagram of the checkout system of the present invention.
Figure 6:
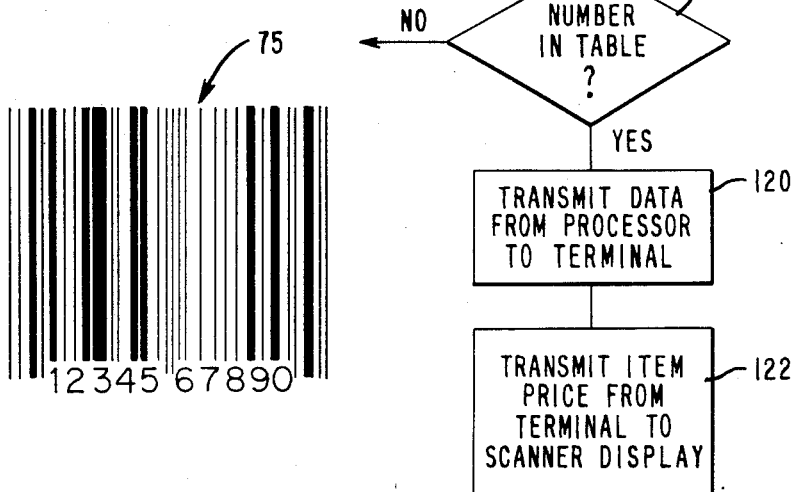

Referring now to FIG. 4, there is shown a block diagram of the data processing system employed in the present invention. Included in the data processing system is the bar code scanning unit 74, shown within the dotted line and located in the checkout counter 20. Included in this system is a scanning assembly and detecting logic unit 76 which includes the optical scanning unit 24 (FIG. 1) for converting scanned bar codes into logic signals. A typical bar code of the type that is used on labels that are located on merchandise items is shown in FIG. 6 and labeled 75. Further included in the scanning unit 74 are the following: an enter gate member 78 for detecting the entrance of a merchandise item onto the cover member 44: an item exit gate member 81 for detecting the removal of the merchandise item from the cover member 44: an encoded data processing logic unit 82 for checking and decoding the signals read by the detecting logic unit 76 and for generating a signal to a gate control logic unit 84 indicating the validity of the read operation: a bad read indicator 105 and a good read indicator 107: a conventional storage unit 88 and an output buffer unit 90 for transmitting the data signals read by the detecting logic unit 76 over line 92. For a more complete description of the scanning unit 74, reference should be made to FIG. 2 of U.S. Pat. No. 4,086,476 and its associated description. The aforementioned U.S. Patent is assigned to the assignee of the present application.

Further included in the system is a data terminal device 94 which transmits the data signals received over line 92 to a processor unit (CPU) 96. The data terminal device 94 also receives signals from the beam cells 32 (FIG. 3) representing the weight of the merchandise item positioned on the cover member 44 (FIG. 1) which signals are then transmitted to the processor unit 96. The processor unit 96, in response to receiving the signals from the data terminal, generates signals representing the price of the weighed merchandise item. The generated data signals represent an item identification number which will be used by the processor 96 to retrieve from a price look-up table (not shown) the price per pound for the merchandise item. In some instances, the data signals generated may represent the price per pound of the item. In either case the processor 96 will calculate the total price for the item and transmit the price data back to the terminal 94 which in turn operates a printer 98 to print the price data on a record member and a customer's receipt member. The terminal 94 also operates the display member 100 (FIG. 1) causing it to display the price of the item.

Figure 5:
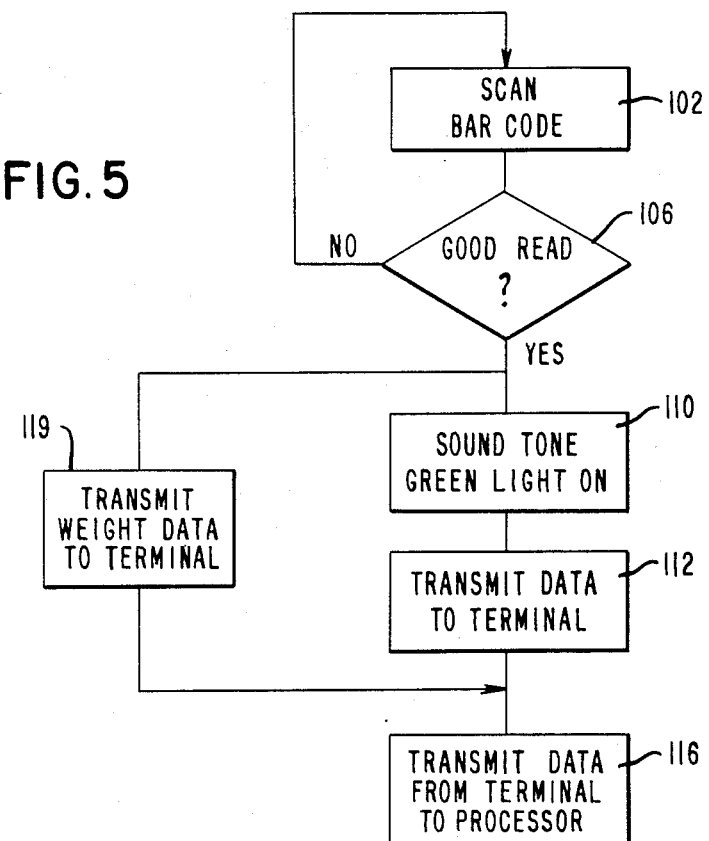
FIG. 5 is a flow chart of a checkout operation which includes the scale apparatus of the present invention and FIG. 6 illustrates a typical bar code that is used on bar coded labels.

There will now be described an operation of the checkout system taken in conjunction with the flow chart diagram of FIG. 5. Movement of a merchandise item across the cover member 44, in the direction indicated by the arrow in FIG. 1 will actuate the enter gate member 78 (FIG. 4) thereby generating an enabling signal for enabling the scanning assembly 76 (FIG. 4) to scan a bar code 75 (FIG. 6) on the merchandise item (block 102) and to generate encoded signals identifying the merchandise item which is transmitted to the processing logic unit 82 (FIG. 4). The processing logic unit 82 will decode and check the encoded data to determine if the data is valid or not and then generate a control signal over line 104 (FIG. 4) to the gate control logic unit 84 indicating a good or bad read operation (block 106). If the scanning operation produces a good read operation, the logic unit 82 will operate a tone generator (not shown) that operates the good read indicator 107 (FIG. 4) by turning on a light indicator 108 (FIG. 1) which, in the present embodiment, is green (block 110). If the scanning operation produces a bad read operation, the logic unit 82 will operate the bad read indicator 105 (FIG. 4) forcing the checkout operator to again scan the bar code 75 on the merchandise item. If the encoded data is determined to be valid by the logic unit 82, the data is transmitted over line 92 (FIG. 4) to the data terminal device 94 (block 112). Upon the generation of a good read operation (block 106), data signals generated by the beam cells 32 (FIG. 3) are also transmitted (block 119) to the data terminal device 94. The data terminal device 94 then transmits all the received data signals to the processor unit 96 (block 116) which in turn uses the data including the identification number of the item to extract the price of the merchandise item from a price look-up table in the processor unit (block 118). If the merchandise item is not listed in the look-up table, the merchandise item is either removed from the checkout operation or some other source of information may be used to find the item price. After obtaining the price of the item and calculating the total price, the processor unit 96 then transmits the price data back to the data terminal device 94 (block 120) which operates the printer 98 (FIG. 4) to print the price on a receipt member and also operates the customer display 100 (block 122) to display the price of the purchased item.

It will be seen that there has been described a processing system including a scale apparatus used in association with an optical scanning system which automatically generates the price of a merchandise item whose price is based on the weight of the item as part of a checkout operation.

While the principles of the invention have now been made clear in an illustrated embodiment, it will be obvious to those skilled in the art that many modifications of structure, arrangements, elements and components can be made which are particularly adapted for specific environments and operating requirements without departing from those principles. The appended claims are therefore intended to cover and embrace any such modifications, within the limits only of the true spirit and scope of the invention.

It is claimed:

1. A checkout system for checking merchandise items having a coded label affixed thereto identifying the merchandise item comprising:
   a checkout counter having a first top surface for supporting a merchandise item thereon;
   a cover assembly positioned on an end portion of the checkout counter having a second top surface coplanar with the first top surface of the checkout counter, said second top surface having an aperture therein;
   optical scanning means positioned in the end portion of the checkout counter adjacent said cover assembly for projecting scanning light beams through said aperture for scanning a coded label on the merchandise item and generating first data signals identifying the merchanise item;
   a first support member mounted on the end portion of the counter between the cover assembly and the optical scanning means;
   a first window member mounted in said first support member in registry with the optical scanning means and said aperture for enabling the scanning light beams of the optical scanning means to be projected through said aperture;
   signal generating means including a load beam cell which includes a first cantilever support member secured to said first support member and a second cantilever member secured to said first cantilever support member;
   a second support member secured to said second cantilever support member and engaging said cover assembly;
   strain gauge means secured to said cantilever support member for generating signals in accordance with the moving of said cover assembly whereby the positioning of a merchandise item on the cover assembly results in the moving of the first and second cantilever support members enabling the strain gauge means to output second data signals representing the weight of the merchandise items;
   processing means connected to said optical scanning means and said signal generating means for generating third data signals representing the price of the purchased merchandise items in response to receiving the first and second data signals; and
   display means controlled by said processing means for displaying the price of the purchased merchandise item in response to the generation of said third data signals.

2. The system of claim 1 which further includes stop means secured to said first support member and extending in a direction towards said third support member for limiting the downward movement of said third support member.

3. The system of claim 2 which further includes:
   guide means secured to said first support member; and
   receiving means secured to said plate member for receiving said guide means upon the positioning of said plate member on said first support member.

4. The system of claim 3 which further includes a deflector member secured to the bottom edge of said first support member for deflecting liquids directed towards said first support member by said channel to a position away from said first support member.

5. The system of claim 1 in which said cover assembly includes;
   a first cover member having a top surface portion in which is located said aperture in registry with said optical scanning means and a plurality of depending feet members;
   a stiffener member secured to said cover member for increasing the rigidity of said cover member; and
   a plate member having a plurality of mounting apertures located therein in registry with said depending feet members whereby the cover member is mounted on said plate member by the positioning of said depending feet members within said mounting apertures.

6. The system of claim 5 which further includes a second window member mounted in said second support member and in registry with said first window member and said optical scanning means whereby the optical scanning means will project scanning beams through said first and second window members and said aperture.

7. The system of claim 6 which further includes:
   a third support member positioned on said first support member, said third support member having a top surface portion which is coplanar with the top surface portion of said first cover member;
   means securing said third support member to said first support member; and
   the top surface portions of said cover member and said third support member includes an edge portion forming a channel therebetween extending to a position adjacent said first support member enabling liquids spilled on said cover member and said third support member to be removed from said members.

8. The system of claim 7 which further includes a raised clamp member secured to said third support member and extending along the edge of said first window member for preventing liquids directed onto the third support member by said channel from spilling onto the first window member.

* * * * *